United States Patent
McCallum et al.

(10) Patent No.: US 8,111,627 B2
(45) Date of Patent: Feb. 7, 2012

(54) DISCOVERING CONFIGURED TUNNELS BETWEEN NODES ON A PATH IN A DATA COMMUNICATIONS NETWORK

(75) Inventors: Gavin McCallum, Falkirk (GB); John Monaghan, Dunbartonshire (GB)

(73) Assignee: Cisco Technology, Inc., San Jose, CA (US)

( * ) Notice: Subject to any disclaimer, the term of this patent is extended or adjusted under 35 U.S.C. 154(b) by 276 days.

(21) Appl. No.: 11/771,551

(22) Filed: Jun. 29, 2007

(65) Prior Publication Data
US 2009/0003223 A1    Jan. 1, 2009

(51) Int. Cl.
*H04L 12/437* (2006.01)

(52) U.S. Cl. ............... 370/248; 370/241.1; 370/250; 370/247; 370/246; 714/25; 714/43

(58) Field of Classification Search .............. None
See application file for complete search history.

(56) References Cited

U.S. PATENT DOCUMENTS

| | | | |
|---|---|---|---|
| 6,205,488 B1 | 3/2001 | Casey et al. | |
| 6,215,765 B1 | 4/2001 | McAllister et al. | |
| 6,222,824 B1 | 4/2001 | Marin et al. | |
| 6,337,861 B1 | 1/2002 | Rosen | |
| 6,396,810 B1 | 5/2002 | Hebel | |
| 6,459,682 B1 | 10/2002 | Ellesson et al. | |
| 6,477,522 B1 | 11/2002 | Young | |
| 6,662,223 B1 | 12/2003 | Zhang et al. | |
| 6,700,874 B1 | 3/2004 | Takihiro et al. | |
| 6,807,515 B2 | 10/2004 | Vogel et al. | |
| 6,813,240 B1 | 11/2004 | Shah | |
| 6,813,242 B1 | 11/2004 | Haskin et al. | |
| 6,891,795 B1 | 5/2005 | Hamachi et al. | |
| 6,963,927 B1 * | 11/2005 | Lee et al. | ........... 709/241 |
| 6,965,577 B1 | 11/2005 | Murphy | |
| 7,076,559 B1 | 7/2006 | Ghanwani et al. | |
| 7,080,141 B1 | 7/2006 | Baekelmans | |
| 7,120,118 B2 | 10/2006 | Rajagopal et al. | |
| 7,120,819 B1 | 10/2006 | Gurer et al. | |
| 7,139,278 B2 | 11/2006 | Gibson et al. | |
| 7,154,858 B1 | 12/2006 | Zhang et al. | |
| 7,280,486 B2 | 10/2007 | Suri | |
| 7,382,738 B2 | 6/2008 | Ravindran et al. | |

(Continued)

FOREIGN PATENT DOCUMENTS

CN    1472924 A    2/2004

(Continued)

OTHER PUBLICATIONS

D. Awduche et al., "Requirements for Traffic Engineering Over MPLS," IETF Network Working Group Request for Comments: 2702, Sep. 1999, published by the Internet Society, 24 pages.

(Continued)

*Primary Examiner* — Huy Vu
*Assistant Examiner* — Zewdu A Beyen
(74) *Attorney, Agent, or Firm* — Hickman Palermo Truong & Becker LLP

(57) ABSTRACT

An apparatus and method are described for discovering a configured tunnel between nodes on a path in a data communications network. In an embodiment, an apparatus is arranged to remotely access at least one node on the path, identify whether a tunnel is configured on the access node and, if so, identify whether the identified tunnel has a fault.

21 Claims, 9 Drawing Sheets

U.S. PATENT DOCUMENTS

| | | |
|---|---|---|
| 7,447,167 B2 | 11/2008 | Nadeau et al. |
| 7,463,591 B1 | 12/2008 | Kompella et al. |
| 7,466,655 B1 | 12/2008 | Zhao |
| 7,471,679 B2 | 12/2008 | Lee |
| 2001/0029543 A1 | 10/2001 | Iwata et al. |
| 2002/0093954 A1 | 7/2002 | Weil et al. |
| 2002/0118636 A1 | 8/2002 | Phelps et al. |
| 2003/0039212 A1 | 2/2003 | Lloyd et al. |
| 2003/0043755 A1* | 3/2003 | Mitchell ............... 370/252 |
| 2003/0048754 A1 | 3/2003 | Bruckman |
| 2003/0048790 A1 | 3/2003 | McAllister et al. |
| 2003/0055925 A1 | 3/2003 | McAlinden |
| 2003/0058804 A1 | 3/2003 | Saleh et al. |
| 2003/0076825 A1* | 4/2003 | Guruprasad ............ 370/389 |
| 2003/0117962 A1 | 6/2003 | Mattson et al. |
| 2003/0118036 A1* | 6/2003 | Gibson et al. .......... 370/401 |
| 2003/0147346 A1* | 8/2003 | Kanakubo .............. 370/227 |
| 2003/0149919 A1 | 8/2003 | Greenwald et al. |
| 2003/0156543 A1 | 8/2003 | Sahinoglu et al. |
| 2004/0081101 A1 | 4/2004 | Bennett |
| 2004/0179471 A1 | 9/2004 | Mekkittikul et al. |
| 2004/0190526 A1 | 9/2004 | Kumar et al. |
| 2004/0193709 A1* | 9/2004 | Selvaggi et al. ........ 709/224 |
| 2004/0199627 A1* | 10/2004 | Frietsch ................ 709/224 |
| 2004/0210892 A1 | 10/2004 | Sharma |
| 2004/0218542 A1 | 11/2004 | Lee |
| 2004/0218595 A1 | 11/2004 | Acharya et al. |
| 2004/0233859 A1 | 11/2004 | Martin |
| 2005/0013259 A1 | 1/2005 | Papoushado et al. |
| 2005/0018647 A1* | 1/2005 | Lebrun et al. .......... 370/351 |
| 2005/0022189 A1 | 1/2005 | Proulx et al. |
| 2005/0053005 A1 | 3/2005 | Cain et al. |
| 2005/0083835 A1 | 4/2005 | Prairie et al. |
| 2005/0207349 A1 | 9/2005 | Nagami et al. |
| 2005/0281192 A1 | 12/2005 | Nadeau et al. |
| 2006/0013142 A1 | 1/2006 | Hongal et al. |
| 2006/0126495 A1 | 6/2006 | Guichard et al. |
| 2006/0168208 A1 | 7/2006 | Nagami |
| 2006/0182034 A1 | 8/2006 | Klinker et al. |
| 2006/0182122 A1 | 8/2006 | Davie et al. |
| 2006/0215577 A1 | 9/2006 | Guichard et al. |
| 2006/0215579 A1 | 9/2006 | Nadeau et al. |
| 2006/0262772 A1 | 11/2006 | Guichard et al. |
| 2006/0268682 A1* | 11/2006 | Vasseur ................. 370/216 |
| 2007/0025241 A1 | 2/2007 | Nadeau et al. |
| 2007/0091897 A1* | 4/2007 | Lee et al. ............. 370/395.5 |
| 2007/0214388 A1* | 9/2007 | Auvenshine et al. ........ 714/27 |
| 2007/0280199 A1* | 12/2007 | Rong .................... 370/351 |
| 2008/0056142 A1 | 3/2008 | Arnold et al. |
| 2008/0080507 A1* | 4/2008 | Swallow et al. ........ 370/392 |
| 2008/0095045 A1* | 4/2008 | Owens et al. .......... 370/220 |
| 2008/0151746 A1* | 6/2008 | Vasseur et al. ......... 370/228 |
| 2008/0205284 A1* | 8/2008 | Azad ................... 370/241.1 |
| 2008/0304494 A1* | 12/2008 | Yokoyama ............ 370/400 |
| 2009/0003223 A1 | 1/2009 | McCallum et al. |
| 2009/0116396 A1 | 5/2009 | Regan et al. |

FOREIGN PATENT DOCUMENTS

| | | |
|---|---|---|
| JP | 2005-269460 | 3/2004 |

OTHER PUBLICATIONS

E. Rosen et al., "Multiprotocol Label Switching Architecture," IETF Network Working Group Request for Comments: 3031, Jan. 2001, published by the Internet Society, 50 pages.

K. Kompella et al., "Detecting Multi-protocol Label Switched (MPLS) Data Plane Failures," IETF Network Working Group Request for Comments: 4379, Feb. 2006, published by the Internet Society, 41 pages.

K. Kompella et al., "Detecting MPLS Data Plane Failures," IETF Network Working Group Internet-draft "draft-ietf-mpls-lsp-ping-03.txt," Jun. 2003, published by the Internet Society, 20 pages.

Anonymous, "MPLS OAM Tools for Troubleshooting MPLS Networks," published by Cisco Systems, Inc., San Jose, California, 2004, 44 pages.

Anonymous, White Paper, "Cisco Multiprotocol Label Switching Management Strategy," published by Cisco Systems, Inc., San Jose, California, 2004, 8 pages.

Anonymous, White Paper, "Cisco MPLS Diagnostics Expert," published by Cisco Systems, Inc., San Jose, California, 2004, 11 pages.

U.S. Appl. No. 11/313,283, filed Dec. 19, 2005, Monaghan et al.

U.S. Appl. No. 11/328,436, filed Jan. 9, 2006.

Kompella, Kiretti, Swallow, George, draft-ietf-mpls-lsp-ping-08-txt, left.org, dated Feb. 2005 (pp. 1-43).

Cisco MPLS Diagnostic Expert, dated 2005 (pp. 1-11), White Paper, Cisco Systems, Inc., San Jose, California.

China Office Action dated Aug. 1, 2008, Chinese Application No. 200680010074.7 (pp. 1-4).

China Office Action dated Nov. 28, 2008, Chinese Application No. 200680004044.5.

China Office Action dated Dec. 26, 2008, English Translation for Chinese Application No. 2006800004006.X (pp. 1-15).

China Office Action dated Mar. 20, 2009, Chinese Application No. 2006/80010074.7 (pp. 1-3).

PCT International Search Report (PCT Articles 18 and Rules 43 and 44) pp. 1-3.

International Search Report dated Aug. 7, 2007 (1 pg).

Stokes et al., Testing Hierarchical Virtual Private LAN Services, Jun. 2002 (pp. 1-25).

Welcher, P., BGP and MPLS-Based VPNs dated Oct. 4, 2000 (pp. 1-8) Chesapeake Netcraftsmen, www.netcraftsmen.net.

Brooks, A., Sacks, L., A Methodology for Monitoring LSP Availability in PLS Networks dated 2002 (pp. 1-4) University of London, www.ee.ucl.ac.uk.

Rosen, E., Rekhter, Y., RFC 4364—BGP/MPLS IP Virtual Private Networks (VPNs) dated Feb. 2006 (pp. 11-12, 26 & 24-26), The Internet Society.

Lewis et al., Troubleshooting Virtual Private Networks, Chapter Title: Troubleshooting MPLS VPNs, May 2004 (pp. 1-59) Cisco Press http://proquest.safaribooksonline.com.

Lewis et al., Troubleshooting Virtual Private Networks, Chapter Title: Troubleshooting Tools, May 2004 (pp. 1-3) Cisco Press http://proquest.safaribooksonline.com.

Lewis et al., Troubleshooting Virtual Private Networks, Chapter Title: Configuring MPLS VPNs, May 2004 (pp. 1-17) Cisco Press http://proquest.safaribooksonline.com.

Cisco IP Solution Center MPLS VPN Management 4.2, dated 2006 (pp. 1-6) Cisco Systems, Inc, San Jose, California.

MPLS VPN-VRF Selection Based on Source IP Address, dated 2004 (pp. 1-18) Cisco Systems, Inc, San Jose, California.

How to Troubleshoot the MPLS VPN, dated 2005 (pp. 1-7) Cisco Systems, Inc, San Jose, California.

Nadeau, T., Morrow, M., Swallow, G., Allan, D., Matsushima, S., OAK Requirements for MPLS Networks—draft-ietf-mpls-oam-requiremtns-02.txt, dated Jun. 2003 (pp. 1-13) IETF, www.ietf.org.

Nadeau, T., Morrow, M., Busschbach, P. Aissaoui, M., Pseudo Wire (PW) OAM Message mapping—draft-ietf-pwe3-oam-msg-map-03.txt, datead Sep. 2005 (pp. 1-20) IETF, www.ietf.org.

Aissaoui, M., Bocci, M., Watkinson, D., Shah, H., Doolan, P., Busschbach, P., Delord, S., OAM Procedures for VPWS Interworking—draft-assaoui-12vpn-vpws-1w-oam-o4-txt, dated Sep. 2005 (pp. 1-23) IETF, www.ietf.org.

Nadeau, T., Aggarwal, R., Pseudo Wire Virtual Circuit Connectivity Verification (VCCV), dated Mar. 2004 (pp. 1-14) IETF, www.ietf.org.

Allan, D., Nadeau, T., RFC 4378—A Framework for Multi-Protocol Label Switching (MPLS) Operations and Management (OAM), dated Feb. 2006 (pp. 1-11) IETF, www.ietf.org.

Bryant, S., Swallow, G., Martini, L., McPherson, D., RFC 4385—Pseudowire Emulation Edge-to-Edge (PWE3) Control Word for Use over an MPLS PSN, dated Feb. 2006 (pp. 1-12) IETF, www.ietf.org.

Martini, L., Rosen, E., El-Aawar, N., Smith, T., Heron, G., RFC 4447—Pseudowire Setup and Maintenance Using the Label Distribution Protocol (LDPp), dated Apr. 2006 (pp. 1-31) IETF, www.ietf.org.

Martini, L., Metz, C., Nadeau, T., Duckett, M., Balus, F., Segmented Pseudo Wire—draft-ietf-pwe3-segmented-pw-02.txt, dated Mar. 2006 (pp. 1-30) IETF, www.ietf.org.

Mark Lewis et al., Book: OSI Model of Chapter 1 in Troubleshooting Virtual Private Networks, May 2004, Cisco Press.

Mark Lewis et al., Book: Troubleshooting Any Transport over MPLS Based VPNs of Chapter 7 in Troubleshooting Virtual Private Networks, May 2004, Cisco Press.

Cisco, "Switching Commands show mpls atm-ldp bindings through show mpls traffic-eng link-management summary", Cisco IOS Switching Command Reference Release, 12.3, 1992-2004 Cisco Systems, Inc., 35 Pages.

Cisco, "Switching Commands: show mpls traffic-eng topology through show tag switching tdp bindings", Cisco IOS Switching Command Reference Release, 12.3, 1992-2004 Cisco Systems, Inc., 20 Pages.

Cisco Systems, "MPLS OAM Tools for Troubleshooting MPLS Networks", 2004, 44 pages.

* cited by examiner

DISCOVERING CONFIGURED TUNNELS BETWEEN NODES ON A PATH IN A DATA COMMUNICATIONS NETWORK

CROSS-REFERENCE TO RELATED APPLICATIONS

The present application is related to prior application Ser. Nos. 11/072,082, 11/091,058, 11/086,007, 11/135,253 and 11/001,149 of T. D. Nadeau et al, the entire contents of which are hereby incorporated by reference for all purposes as though fully set forth herein.

TECHNICAL FIELD

The present disclosure generally relates to configured tunnels. The disclosure relates more specifically to discovering a configured tunnel between nodes on a path in a data communications network.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

One such protocol is MPLS (Multi Protocol Label Switching), which is described in the document "Multi Protocol Label Switching Architecture" which is available at the time of writing on the file "rfc3031.txt" in the directory "rfc" of the domain "ietf.org" on the World Wide Web. According to MPLS, a complete path for a source-destination pair is established, and values required for forwarding a packet between adjacent label switched routers (LSRs) in the path together with headers, or tags or "labels" are pre-pended to the packet. The labels are used to direct the packet to the correct interface and next hop. The labels precede the Internet Protocol (IP) header or other header allowing smaller outer headers.

The path for the source-destination pair, termed a Label Switched Path (LSP), can be established according to various different approaches. One such approach is the Label Distribution Protocol (LDP) in which each router in the path invokes an LDP session with neighboring LSRs and sends its label to the next hop router on the path as determined from its IP routing table. Alternative label distribution mechanisms include Resource Reservation Protocol (RSVP) in which case, for example, a network administrator can engineer a path, providing strict source routing and modifications to Interior Gateway Protocols (IGPs). In all cases a Label Forwarding Information Base (LFIB) stores both the next-hop information for the LSP, together with the label required by the next hop as a label binding.

For each LSP created, a forwarding equivalent class (FEC) is associated with the path specifying which packets are mapped to it. At an ingress LSR to the LSP, packets destined, for example, for a certain destination or "prefix" are assigned to a corresponding FEC and injected into the LSP with the LSP next-hops ingress label pre-pended. The LSP next-hop router swaps its ingress label with an egress label received from its next-hop router and so forth. At an LSP egress router, the ingress label is removed and the packet is forwarded on towards the destination prefix according to the routing protocol supported thereafter.

One known use of MPLS is in MPLS virtual private networks (VPNs), where an LSP is established between ingress and egress provider edge routers (PE) accessible by respective customer edge (CE) routers, providing an effective tunnel between customer edge routers.

DETAILED DESCRIPTION

Figure 1:
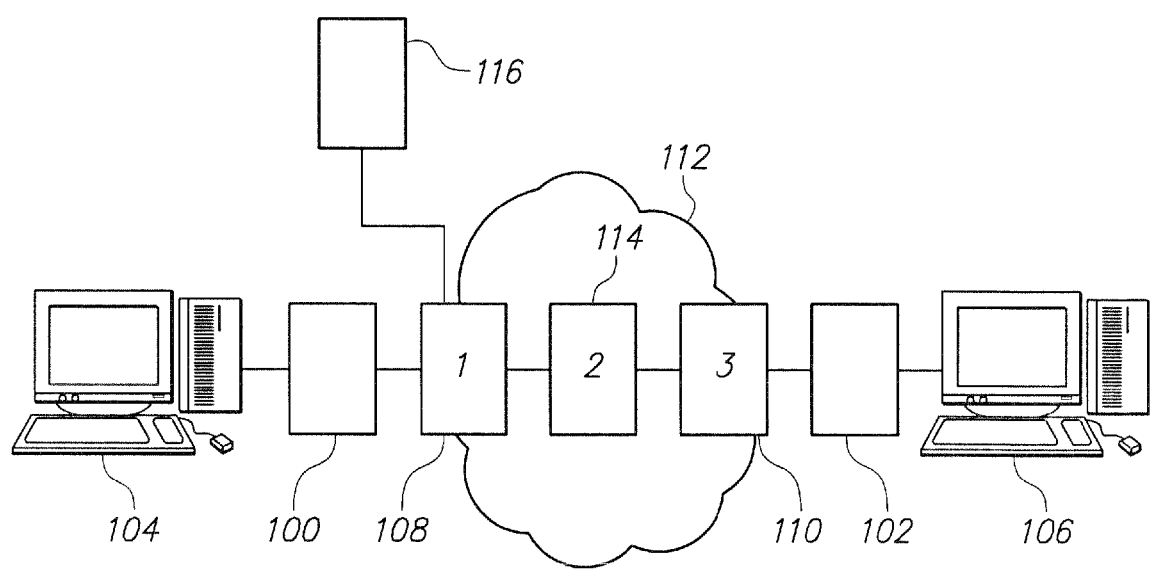
FIG. 1 is a representation of a network in relation to which an example method described may be applied.

Embodiments of methods and apparatus for discovering a configured tunnel is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method and apparatus for discovering a configured tunnel
4.0 Implementation Mechanisms-Hardware Overview
5.0 Extensions and Alternatives 1.0 General Overview In an embodiment, an apparatus comprises first logic encoded in one or more tangible media for execution and when executed operable for discovering a configured tunnel between nodes on a path in a data communications network by remotely accessing at least one node on the path; second logic which when executed is operable to identify whether a tunnel is configured on the accessed node; and third logic which when executed is operable, when a tunnel is configured on the accessed node, to identify whether the identified tunnel has a fault.

In an embodiment, the apparatus further comprises logic which when executed is operable to generate a fault report on a graphical user interface.

In an embodiment, the apparatus further comprises logic which when executed is operable to discover tunnel components in an identified tunnel.

In an embodiment, the apparatus further comprises logic which when executed is operable to determine if multiple tunnels are identified as configured on the accessed node, and further comprising logic which when executed is operable to identify whether each of the identified tunnels has a fault.

In an embodiment, the apparatus further comprises logic which when executed is operable to first access an ingress node to a label switched path and to subsequently access at least one node downstream of the ingress node in the label switched path.

In an embodiment, the apparatus further comprises logic which when executed is operable to obtain additional information relating to one or more of the nodes in an identified tunnel, in which the additional information includes at least one of tunnel identification, interface identification, and tunnel source and destination identification.

In various embodiments, the apparatus comprises one of a bridge, switch or router. In an embodiment, the tunnel comprises a multi-protocol label switching traffic engineered (MPLS TE) tunnel. In an embodiment, the apparatus further comprises logic which when executed is operable to identify whether the identified tunnel has a fault using a connectivity check across the tunnel.

In other aspects, embodiments encompass a computer-implemented method and a computer-readable medium configured to perform the functions of the apparatus.

2.0 Structural and Functional Overview

FIG. 1 is a diagram of an example network in relation to which the method can be applied. In FIG. 1 the example network is highly simplified, and the approaches herein can be applied equally to any appropriate network having a network path, at any layer and having any level of complexity.

The network comprises an MPLS VPN between first and second customer edge routers 100, 102 connected to respective customer devices or user devices 104, 106. Each customer edge device is connected to a respective provider edge devices 108, 110. The provider edge devices 108, 110 communicate across an MPLS network designated generally 112 and in particular define a network path in the form of an LSP further including an intermediate LSR 114. In the embodiment of FIG. 1, the LSP progresses from the provider edge router acting as an ingress LSR1, 108 via intermediate LSR2, 114 to an egress LSR3, 110. The connection between customer edges may be bi-directional as appropriate, in which case a further LSP in the opposite direction is also set up.

To perform fault diagnosis of the LSP comprising LSR1, LSR2, LSR3, a network management application is resident on a network management system (NMS) 116 which is off line in the sense that it is not part of the network. The NMS 116 can be located at any appropriate point on or without the network and can be a single or distributed entity or multiple independent but coordinated entities.

MPLS VPN traffic from user device 104 to user device 106 is forwarded first to customer edge router 100 and then on to provider edge router 108 where the traffic is injected into the LSP defined by routers LSR 1, 2, 3. At LSR 3 the traffic leaves the LSP and is forwarded normally onto customer edge router 102 by provider edge router 110 and from there onto user device 106.

The NMS identifies a node on a network path experiencing a fault, remotely accesses the diagnosable node and performs a diagnostic routine at the diagnosable node. Typically the connectivity faults only can be isolated and located for LDP signaled LSPs. MPLS networks often contain a mix of LDP signaled LSPs and MPLS traffic engineered (TE) tunnels. In such networks, operators have to determine which of these tunnel types is being used for the network path for subsequent trouble shooting. If MPLS TE tunnels are being used to carry customer traffic, they can have complex topologies, such as load balancing or traffic protection schemes and such topologies can make it more difficult for the operator to troubleshoot.

For example, MPLS TE tunnels can experience data-plane failures which cause client applications, (for example services which are using the tunnels) to fail. Although instrumentation is available, for example, in Cisco IOS® Software from Cisco Systems, Inc., San Jose, Calif., to test and verify the tunnel data planes, using the instrumentation requires knowledge of where the tunnels are in the network. In a complex network, dynamically determining traffic path tunnel types and topology is a manual operation which is very time consuming and can be error prone. Indeed according to current approaches the level of use of MPLS TE tunnels can be difficult to establish for various reasons. For example, one or both of the ingress and egress nodes to the tunnel may not be at the provider edge, or traffic engineering poses different failure conditions and can take different topologies as well as requiring multiple tunnels as well as the different topology permutations in which they can exist.

Figure 2:
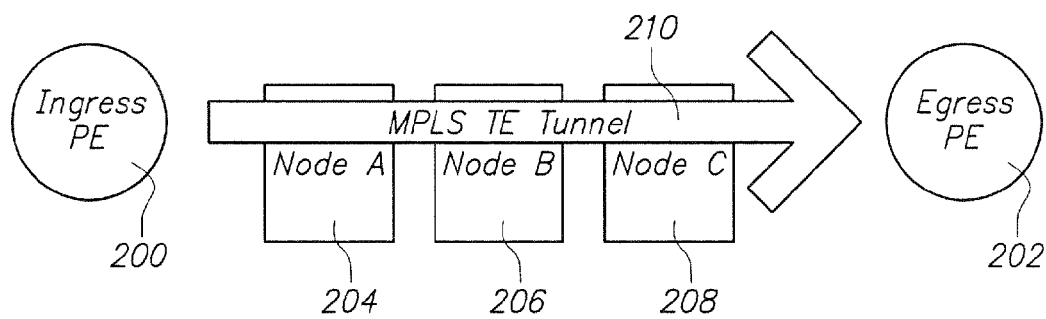
FIG. 2 is a representation showing in more detail a network in relation to which an example method described may be applied.

One example MPLS TE tunnel configuration is shown in FIG. 2 which is a schematic diagram illustrating a network topology where an LSP is in place between an ingress provider edge (PE) 200 and an ingress PE 202 via nodes A, 204, B, 206 and C, 208. In addition, a unidirectional MPLS TE tunnel 210 is configured on the ingress PE, terminating on the egress PE. In order to troubleshoot an arrangement according to existing approaches the tunnel topology can be uploaded to an off-line database and used to test the tunnels in the network. However such an off-line model must be synchronized with the network and any changes occurring in it.

In overview, the approaches described herein allow testing and discovery of tunnel topologies relevant to overlying services that are used for various tunnel types, including configured tunnels such as MPLS TE tunnels. The approaches overcome problems with offline networks and the attendant synchronization issues by dynamically discovering one or more relevant tunnels during the troubleshooting process, and by testing each tunnel using appropriate node instrumentation in, for example, IOS or other node instrumentation. As a result, there is no requirement for prior knowledge of the existence of tunnels as the tunnels themselves as well as their topology can be discovered.

The approaches can be implemented by any appropriate system such as a network management system (NMS). The approaches allow discovery of all tunnel types including PE-PE, PE-P (provider edge to non provider edge node on the path), P-P and P-PE tunnels along with link and node protection tunnels for example of the kind implemented in repair path approaches. For example a unidirectional tunnel configured on an ingress PE and terminating on an egress PE can be automatically discovered according to the method described herein. By allowing discovery of tunnels not only between provider edges, but also intermediate along the path, all different types of tunnel failure and topologies can be accommodated and dealt with by automated diagnosis.

Figure 3A:
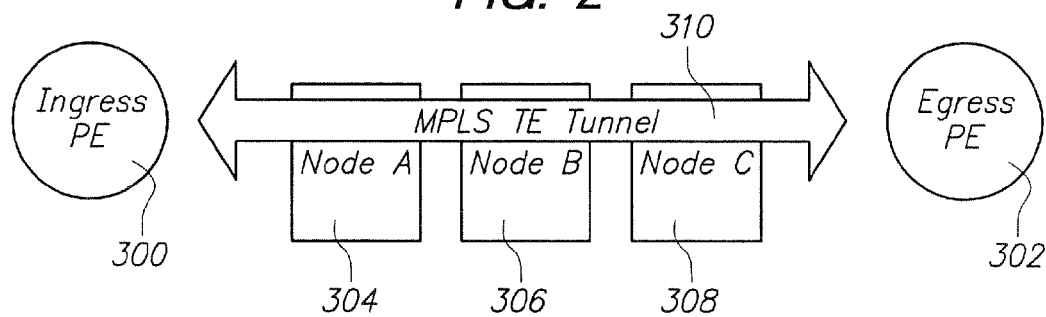
FIG. 3A is a representation of an alternative network configuration in relation to which an example method described may be applied.
Figure 3B:
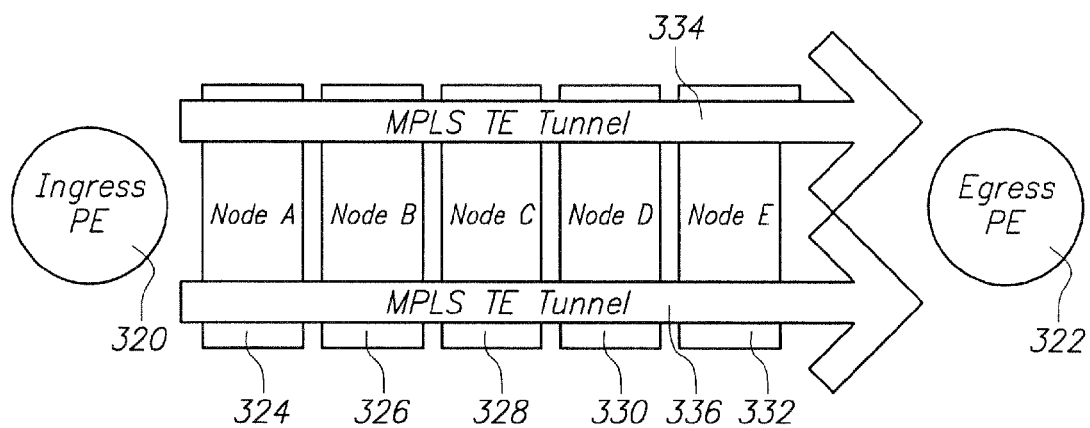
FIG. 3B is a representation of an alternative network configuration in relation to which an example method described may be applied.
Figure 3C:
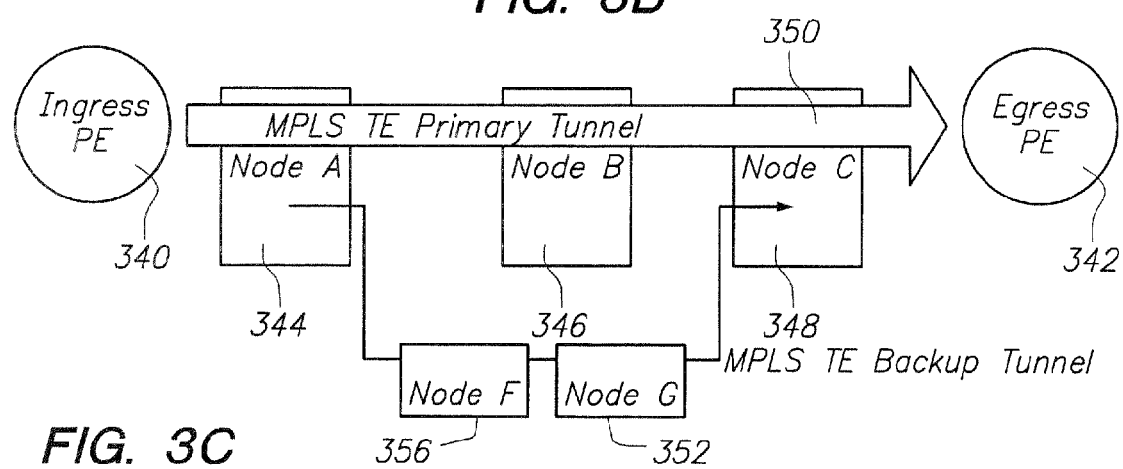
FIG. 3C is a representation of an alternative network configuration in relation to which an example method described may be applied.

The types of tunnels that can be diagnosed according to the method described herein include those shown in FIG. 3A, FIG. 3B and FIG. 3C, which show example possible network topologies. In other embodiments, any other appropriate network or topology type can be used and accommodated.

Referring first to FIG. 3A, a network includes an ingress PE 300, an egress PE 302 and intermediate nodes A, B, C, denoted by reference numerals 304, 306, 308. The intermediate nodes 304, 306, 308 form, for example, an MPLS LSP between the ingress PE 300 and egress PE 302. In addition, a bidirectional MPLS TE tunnel 310 is configured on the ingress PE 300 to the egress PE 302, and also configured on the egress PE 302 to the ingress PE 300.

Referring to FIG. 3B, between an ingress PE 320 and an egress PE 322, an MPLS LSP includes nodes A, B, C, D, E, denoted by reference numerals 324, 326, 328, 330, 332. In order to perform load balancing, two MPLS TE tunnels 334, 336 are configured on the ingress PE 320, terminating on the egress PE 322, which may in practice use different nodes.

Referring to FIG. 3C, a network includes an ingress PE 340 and a egress PE 342 with intermediate nodes A, B, C, denoted by reference numerals 344, 346, 348 on an LSP therebetween. A unidirectional MPLS TE primary tunnel 350 is configured on the ingress PE, terminating on the egress PE, providing a primary tunnel path ingress PE-A-B-C-egress PE. In addition, a repair path is instigated at node A to protect node B. The repair path may use, for example, existing fast reroute techniques. In the event of failure, node A will forward packets that would have otherwise traversed node B via a backup path using nodes F 350 and G 352, to node C in an MPLS TE backup tunnel 354 providing a backup route ingress PE-A-F-G-C egress PE. Hence the backup tunnel provides a P-P tunnel. It will be appreciated that in addition other tunnel configurations such as PE-P (for example a tunnel from ingress PE to node C) or a P-PE tunnel (for example from node A to the egress PE) can be accommodated according to the approaches described herein.

Figure 4:
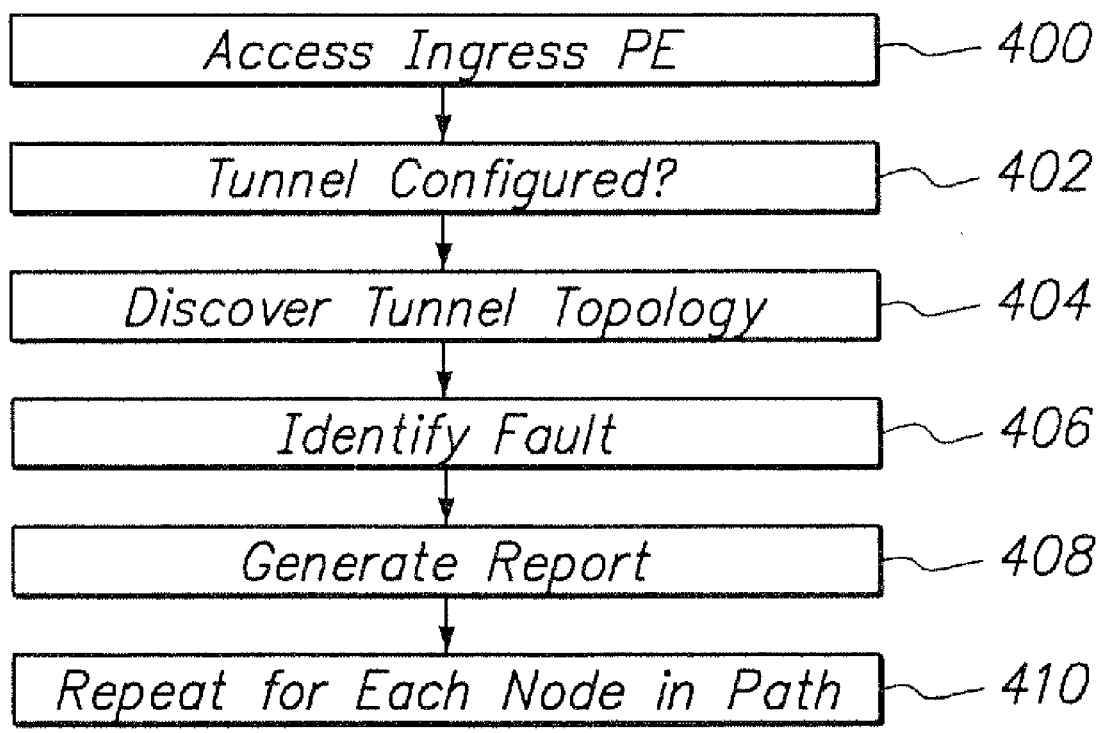
FIG. 4 is a flow diagram illustrating at a high level implementation of an example method.

The approaches described herein can be further understood with reference to FIG. 4 which is a flow diagram illustrating at a high level certain steps implemented by an NMS or other diagnosing or troubleshooting node.

At step 400, an apparatus for discovering a configured tunnel between nodes on a path in a data communications network remotely accesses at least one node on the path, for example the ingress PE on an MPLS LSP according to a pre-requisite data set which may include the traffic destination, which might be a PE device, CE device or customer hosted device. The remote access may be triggered manually or automatically as discussed in more detail below. The accessed node may comprise any network node such as a bridge, switch or router and may alternatively be any other node on the MPLS PE. The apparatus performing the remote access may comprise, for example, an NMS or other diagnosing or discovering node.

At step 402 the apparatus identifies whether a tunnel is configured on the accessed node, which can any be appropriate engineered tunnels such as an MPLS TE tunnel or any other administrator engineered or automatically or auto announced tunnel such as a load balancing tunnel or backup path/fast reroute tunnel. The apparatus can diagnose whether a tunnel is present and configured on the PE and whether traffic for the target destination would traverse a tunnel as described in more detail below. If there are multiple tunnels for example in the case of load balancing, each tunnel is identified and the steps performed for each.

At step 404, the tunnel topology is discovered including tunnel information such as any tunnel identifier, relevant interface source and destination identifiers.

At step 406 the apparatus identifies whether the tunnel has a fault as described in more detail below using for example LSP ping and traceroute commands appropriately modified for MPLS TE and information is gathered on each node in the tunnel.

At step 408 a report is generated. For example, the report may indicate that there is a fault on the tunnel and may also give tunnel topology information which can be displayed in any appropriate manner for example on a GUI for an administrator.

At step 410 the preceding steps are repeated for each router on the path which is calculated according to the method steps set out below. This may only be implemented if no fault is found on the PE (or preceding nodes in the tunnel) or may be additionally be implemented in order to obtain additional topology information. As a result it will be seen that not only can PE-PE and PE-P tunnels be identified by remotely accessing the PE, but that further P-P or P-PE tunnels can be identified by remotely accessing one or more downstream nodes in the LSP and repeating the steps set out above.

In addition, if no faults are diagnosed on any MPLS TEs identified then the approach described in Monaghan et al. (as described in "A method and apparatus for diagnosing a fault in a network path" as U.S. patent application Ser. No. 11/313, 283 on 19 Dec. 2005, the entire contents of which are hereby incorporated by reference as if fully set forth herein) can be pursued to identify any faults arising on MPLS LSPs. Furthermore where any node on the path is not compliant with the various tunnel and path discovery techniques then the techniques can then skip such nodes and move on to the next downstream path such that diagnosis is still implemented.

The approach described can be applied for protection of any kind of network topology and path fault including network outages caused by operator configuration, failure of tunnels not arising from underlying IP forwarding, tunnel "black holes" into which packets are being dropped, failure on the tunnel return path, failure to label packets or label allocation problems or chip failure on a router line card (LC).

As a result the approaches herein provide automated MPLS TE tunnel discovery, diagnostic features and identification of MPLS TE tunnels having a fault even where the network topology is not already known.

3.0 Method and Apparatus for Discovering a Configured Tunnel

Embodiments can further be understood with reference to the flow diagrams of FIG. 5 to FIG. 7B which illustrate method steps carried out according to various embodiments.

Figure 5:
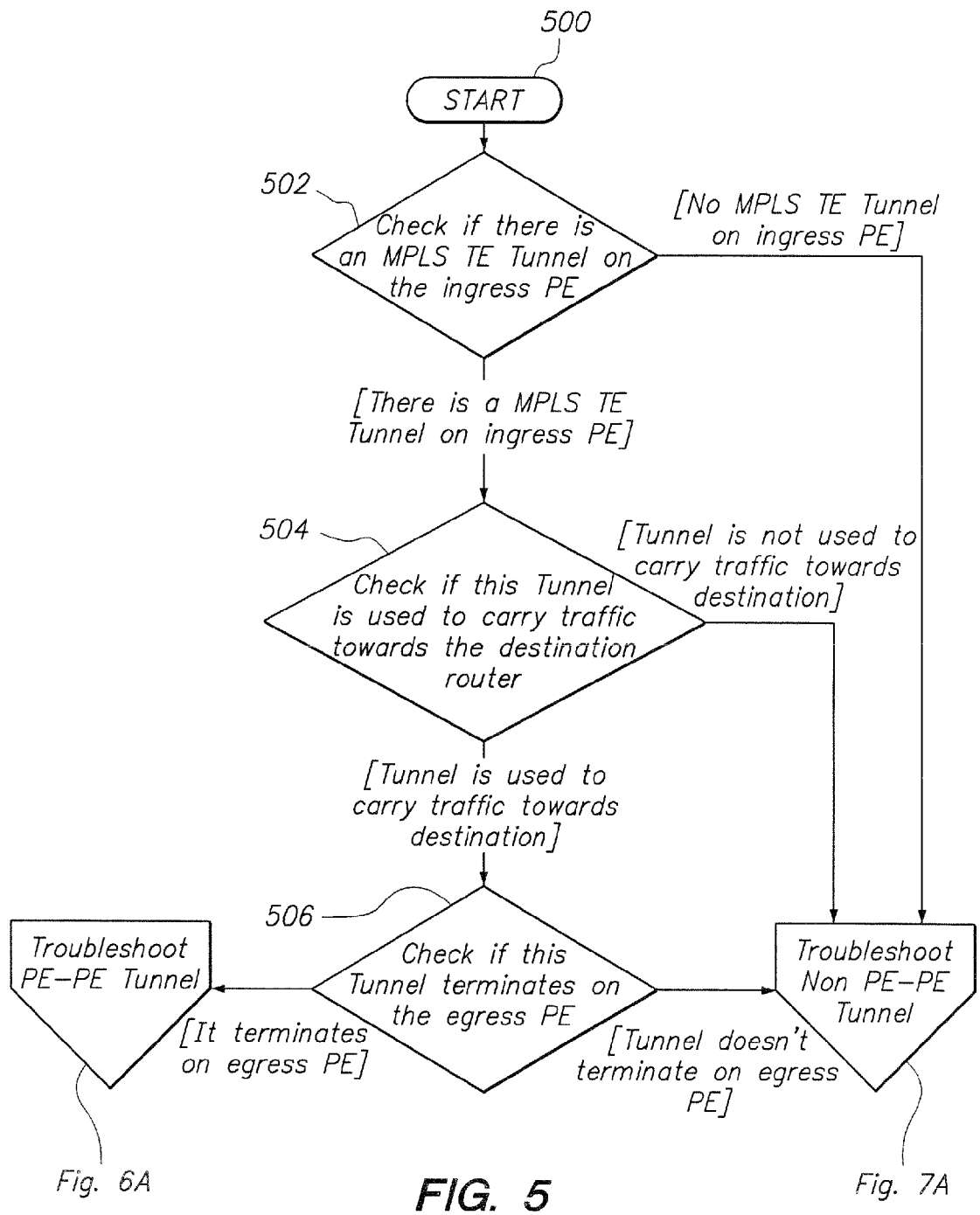
FIG. 5 is a flow diagram illustrating at a low level implementation of an aspect of an example method.

Referring first to FIG. 5 the approach described herein is implemented for example by an NMS at step 500 using MPLS operation and administration and management OAM techniques. MPLS OAM can be further understood from the document "Detecting Multi-protocol Label Switched (MPLS) Data Claim Failures" described in IETF RFC 4379.

The NMS may provide the processes and algorithms described herein integrated into a user interface which captures the parameters necessary to identify the LSP to be tested for example from user/administrator input or triggered from the network services. The parameters may include ingress PE host name, egress PE host name, outgoing interface name and IP address configured the on ingress PE towards the customer premise router and outgoing interface name and IP address configured on the egress PE towards the customer premise router. In some instances there is no requirement for the interfaces and addresses facing the customer premise routers since they do not play a part in the TE topology optional address out with the TE topology domain could be supplied. This would represent the destination of the traffic experiencing the problem and could be used by the algorithm to determine if a tunnel would be used to carry traffic towards that destination.

In an embodiment, the user can then initiate a test to run various steps as described in more detail below, initiating the testing and subsequent diagnostic topology discovery algorithm. Alternatively the trigger for an application to use the method can be automatically generated. For example it may be a pro-active failure detection using any known (OAM) technique such as LSP—health monitor or any other approach well known to the skilled reader. Such an approach would be the stimulus to begin the TE discovery and test algorithm to identify whether the TE tunnels are the source of the problem. Alternatively during testing the problem may be detected and in any event the NMS may then be signaled to perform the approach as described below.

At step 502 the NMS remotely accesses the ingress PE and checks whether one or more MPLS TE tunnels are configured thereon. This can be done, for example by interrogating the forwarding table at the ingress PE using the known ingress PE address as configured on the GUI. In particular the data required to commence the troubleshooting process includes Local PE loopback IP Address, Remote PE loopback IP Address & Subnet Mask. Information in relation to traffic engineered tunnels can be obtained in any appropriate manner for example using proprietary features present within Cisco IOS® Software provided by Cisco Systems Inc. of San Jose, Calif. as further described in IETF RFC 2702. The manner in which the NMS can remotely access a node will be well known to the skilled reader such that detailed description is not required here.

In summary, however, the NMS may maintain a network image including information on access credentials for each node such as any passwords required to log on to the node. The NMS may then remotely access the node for example automatically logging on using the access credentials. Such a remote access or log on step is carried out using any appropriate approach and effectively comprises remote accessing of the operating system or command line interface (CLI) of the diagnosable node, for example using management protocols such as simple network management protocol SNMP or proprietary APIs implemented in XML over some other transport such as HTTP. The management traffic for remote access can be sent "in-band" for example over an LSP or "out-of band" for example over an alternate, logical or hard-wired path such as a serial/terminal server, and in any appropriate form including encrypted form.

Several different specific approaches may be used to detect tunnels. For example the IOS CLI "show" command can be communicated to the remote node by the NMS, and the NMS can parse and analyze a response from the node. The "show" command can initiate checking of the forwarding table on the node and the information can then be accessed by the NMS from the CLI command response that the node sends back to the NMS.

The process branches at step 502 depending on whether an MPLS TE is identified as being configured on the ingress PE. If such a tunnel is discovered, then at step 504 the process checks whether the tunnel is used to carry traffic towards the destination router or address. If so, then at step 506 the process checks whether the tunnel terminates on the egress PE. If so then the tunnel is a PE-PE tunnel and the process branches to a troubleshoot/diagnosis/tunnel discovery approach described in more detail with reference to FIG. 6A and FIG. 6B.

If the tunnel is not found to carry traffic towards the destination router or the tunnel does not terminate on the egress PE then the process branches to a non PE-PE tunnel troubleshoot/diagnosis/discovery routine. An example routine is described in more detail below with reference to FIG. 7A and FIG. 7B.

Figure 6A:
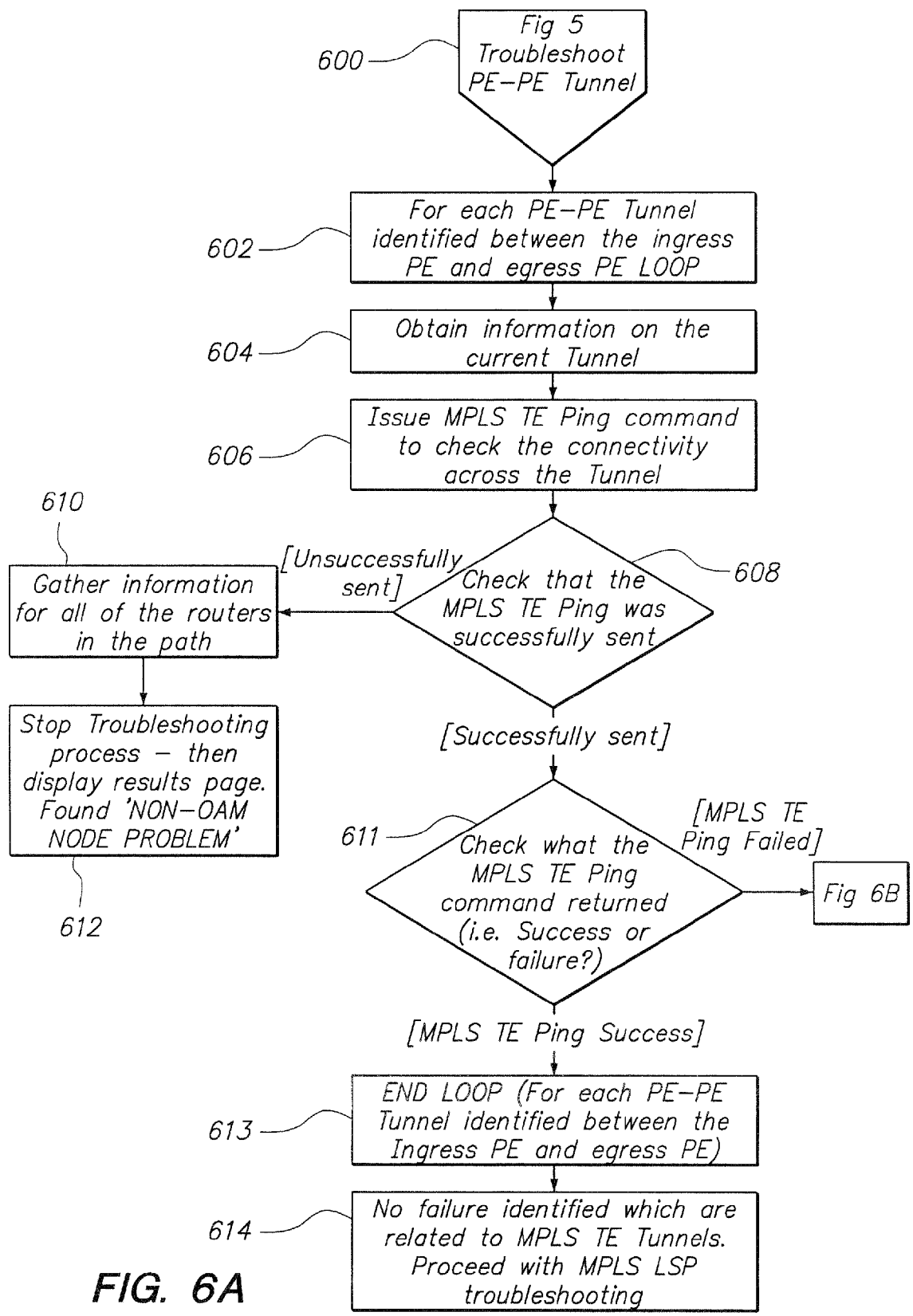
FIG. 6A is a flow diagram illustrating at a low level implementation of a further aspect of an example method.

FIG. 6A illustrates the PE-PE approach. In FIG. 6A a process begins at step 600 and instigates a loop at step 602 for each PE-PE tunnel identified between the ingress PE and the egress PE. In the case of multiple tunnels, additional information can be obtained for example from the forwarding table to establish whether the tunnels are load balancing, unidirectional or multidirectional and so forth as appropriate.

At step 604 information on the current tunnel, including tunnel identifier, interface name, tunnel source and destination identifiers is obtained once again by interrogation of the forwarding table at the node.

At step 606, connectivity across the PE-PE tunnel is checked using any appropriate connectivity check such as an MPLS TE ping command. For example, the ping command can be of the type provided by path verification protocol (PVP) as set out in certain prior US patent applications, namely application Ser. No. 11/072,082, application Ser. No. 11/091,058, application Ser. No. 11/086,007, application Ser. No. 11/135,253, and application Ser. No. 11/001,149, of T. D. Nadeau et al. In other embodiments, the tests can be modified in any appropriate manner to accommodate MPLS TE tunnels. Such modifications can be accomplished according to the document "Detecting MPLS data plane failures," IETF RFC 4379. A benefit of the ping command is that it can include features allowing back-up tunnels to be tested by forcing traffic down such tunnels allowing additional testing and discovery which can be used in conjunction with the IOS "show" command interrogating TE database on the node to provide additional information.

At step 608 the process checks that the MPLS TE ping was successfully sent. If not, then at step 610, information is gathered for all of the routers in the path. For example this can be performed using a known information gathering approach such as MPLS TE traceroute command.

Additionally or alternatively, one approach for detecting faults is described in "Detecting MPLS Data Plane Failures" of Kompella et al ("Kompella") which is available at the time of writing on the file "draft-ietf-mpls-lsp-ping-03.txt" in the directory "proceedings/03jul/I-D" of the domain "ietf.org" of the World Wide Web. According to the approach described therein, in a first detection step a "LSP ping" command is sent followed by an "LSP traceroute command". The LSP ping corresponds to an internet control message protocol (ICMP) ping comprising a packet sent along the path from the ingress point which is responded to from the egress point. Receipt of the response indicates that the path is healthy. LSP traceroute comprises a message which is received at each router along the LSP, passed along and responded to with additional diagnostic information. If there is a fault then the vicinity in which it occurred can be determined from identifying which furthest router sent a traceroute response. In addition the response itself may carry some low level diagnostic information.

The traceroute aspect is relevant to step 610 because the approach described in Kompella will tell a network administrator whether the path is healthy or broken and the general vicinity of any fault, but provides little more useful information. Any appropriate modification may be made to the LSP traceroute approach described therein to allow it to operate as a TE traceroute. For example the LSP traceroute mechanism can be used by supplying the TE forwarding equivalence class (FEC) type and tunnel identifier as described in RFC 4379.

At step 612 the troubleshooting process can be terminated and appropriate results displayed for example on a GUI. In the present case the report may be, for example, "NON OAM NODE PROBLEM" if the node could not send the MPLS TE ping command.

At all steps in the process, having isolated and diagnosed the fault, a report may be produced automatically, for example, at a graphical user interface (GUI) or on hard copy at the network management system remotely identifying the diagnosed fault. The report may present a conclusion as to the nature of the fault and recommended actions to take in response, or an "observation" identifying important characteristics of the path and nodes on the path that have been identified during the diagnosis.

For example, a report may state "Observation 1: traceroute has revealed packet is unlabeled, Observation 2: ACL present on interface on path in the case that the fault cannot be identified." Such a report allows the administrator to make an educated decision as to the nature of the actual fault. In addition, in an embodiment a test log is produced by the system running providing an audit trail of the steps taken, which can be used by the administrator to assess what steps have already been taken and what further steps need to be taken. Appropriate alarms or alerts can also be generated for example physically or on screen. The tunnel topology can be rendered graphically between the end points on the GUI including network element names, port and interface names as well as label swapping along the path, for example based on the output of PVP ping or path trace or derived from device interrogation and hence showing backup/nested tunnels.

In all cases, in addition to the report, a test log comprising an audit trail of the steps taken may be made available to the administrator to show what has taken place. An image of the actual network can be visually represented showing the relevant information including the routes part of the network, their IP addresses and other appropriate information such as access credentials. The test log can be attached to a "trouble ticket" which is forwarded on to the appropriate manager and shows the steps that have been completed and the conclusions reached. The provision of observations allows a distinction between diagnosable failures and issues that may cause a failure but cannot provide deterministic diagnosis such as ACL blocks and the various other steps described above.

In addition to the various reports, further suggested actions can be recommended to correct the fault, for example, derivable from a database corresponding to the report messages generated. In particular the failure condition can be graphically represented including a summary field identifying in the type of problem encountered, a possible cause field identifying the precise nature of the problem and a recommended action field identifying what the operator should do to rectify the problem. Still further, the network management system can automatically, or under administrator control, effect a repair on a faulty node, based on the diagnosis.

Reverting to step 608, if the ping command was successfully sent then at step 611 the report returned with the command, which may be either success or failure, is checked. If the report indicates success then at step 613, if there are no further PE-PE tunnels the process proceeds to step 614 as no faults have been identified related to MPLS TE tunnels. A report can be generated accordingly and further diagnostic and other checks performed for example in relation to the MPLS LSP itself as described in Monaghan et al. If there are further PE-PE tunnels then steps 614 to 612 are repeated for each additional tunnel.

Figure 6B:
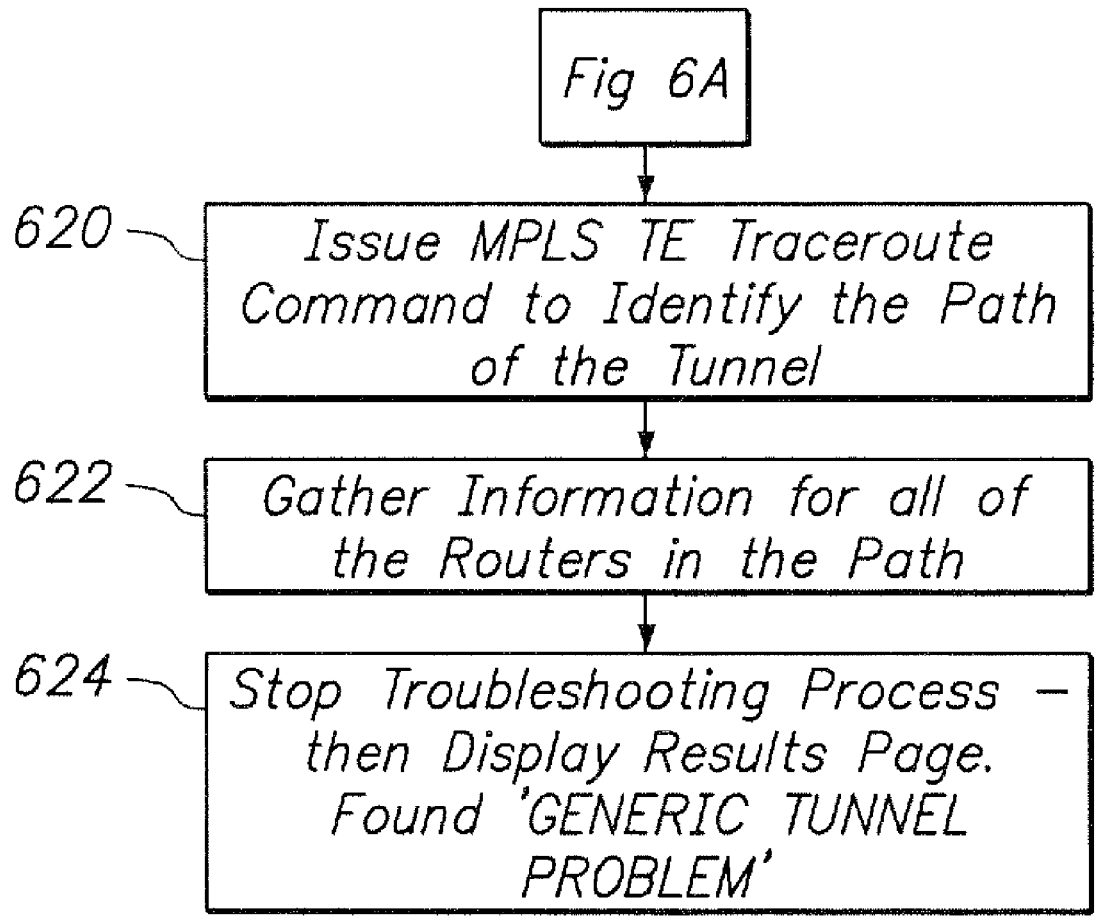
FIG. 6B is a continuation of FIG. 6A.

If, at step 610, the report returned by the ping command is a failure report then the report proceeds to the steps set out at FIG. 6B. At step 620 an MPLS TE traceroute command is issued to identify the path of the tunnel. The traceroute command comprises a successive check at each node which is responded to with additional diagnostic information.

The responses received can be collated at step 622 and at step 624 the process can be terminated and the result displayed on a GUI. For example, the message "GENERIC TUNNEL PROBLEM" can be displayed together with diagnosis topology information in the manner described above in relation to step 612 providing information on TE specific problems. For example, an additional diagnosis step may be implemented to obtain the relevant information.

In addition, as indicated above and as for all reports generated according to the method and apparatus described herein, additional information such as the topology and other diagnostic information can be presented as obtained from appropriate TE diagnosis steps. For example, additional information such as the labels used for the MPLS TE tunnels can be displayed and this can identify nested labels or label stacks providing full connectivity information as appropriate. As a result, the end result is a report of not only of what the problem is such as a broken LSP because the tunnel is broken, but in the event of an appropriate diagnosis step the cause and location of the problem as well as a recommendation of how to repair can be indicated.

The approach described with reference to FIG. 6A and FIG. 6B is specifically directed to the case in which PE-PE TE tunnels are detected as being configured. However, the approaches described herein further extend to tunnels being configured from the ingress PE to a node along the LSP path but not the egress node (a so called P node), that is a PE-P tunnel. In addition intermediate P nodes along the path may have TE tunnel configured either to other P nodes (P-P tunnel) or to the egress PE node (a P-PE tunnel). In particular at FIG. 5 if no TE tunnels are detected on the ingress PE at step 502, or if any TE tunnels on the ingress PE are not found to carry traffic at step 504 or if any TE tunnels found on the ingress PE do not ingress PE do not terminate on the egress PE at step 506 then the process proceeds to the non PE-PE tunnel troubleshoot/diagnosis/discovery routine described now with reference to FIG. 7A and FIG. 7B.

The non PE-PE process commences at step 640 to allow detection of backup tunnels, for example, that may be configured at each device in the LSP, as described in more detail below once again. The steps can be augmented by further IOS "show" commands to determine if protection schemes are configured, such as link or no protection fast reroute schemes providing MPLS TE tunnels, and to appropriately troubleshoot over the backup tunnel path as described in more detail below. As a result various configurations including those shown in FIG. 3A to FIG. 3C can be accommodated.

In particular each device in the trace can be logged into by the NMS in order of the trace route entries as described in more detail below to determine if there are tunnels configured towards the egress device for example by using IOS "show" commands hence the egress PE device needs to be supplied: as, in order for the algorithm to determine if the affected traffic would encounter a tunnel, the egress PE device used. Operating system commands are then used to determine whether the traffic destined for the egress device would use a tunnel to get there. If tunnels are configured then a series of IOS "show" commands can be issued to identify if the configured tunnel is the cause of the connectivity problem.

Figure 7A:
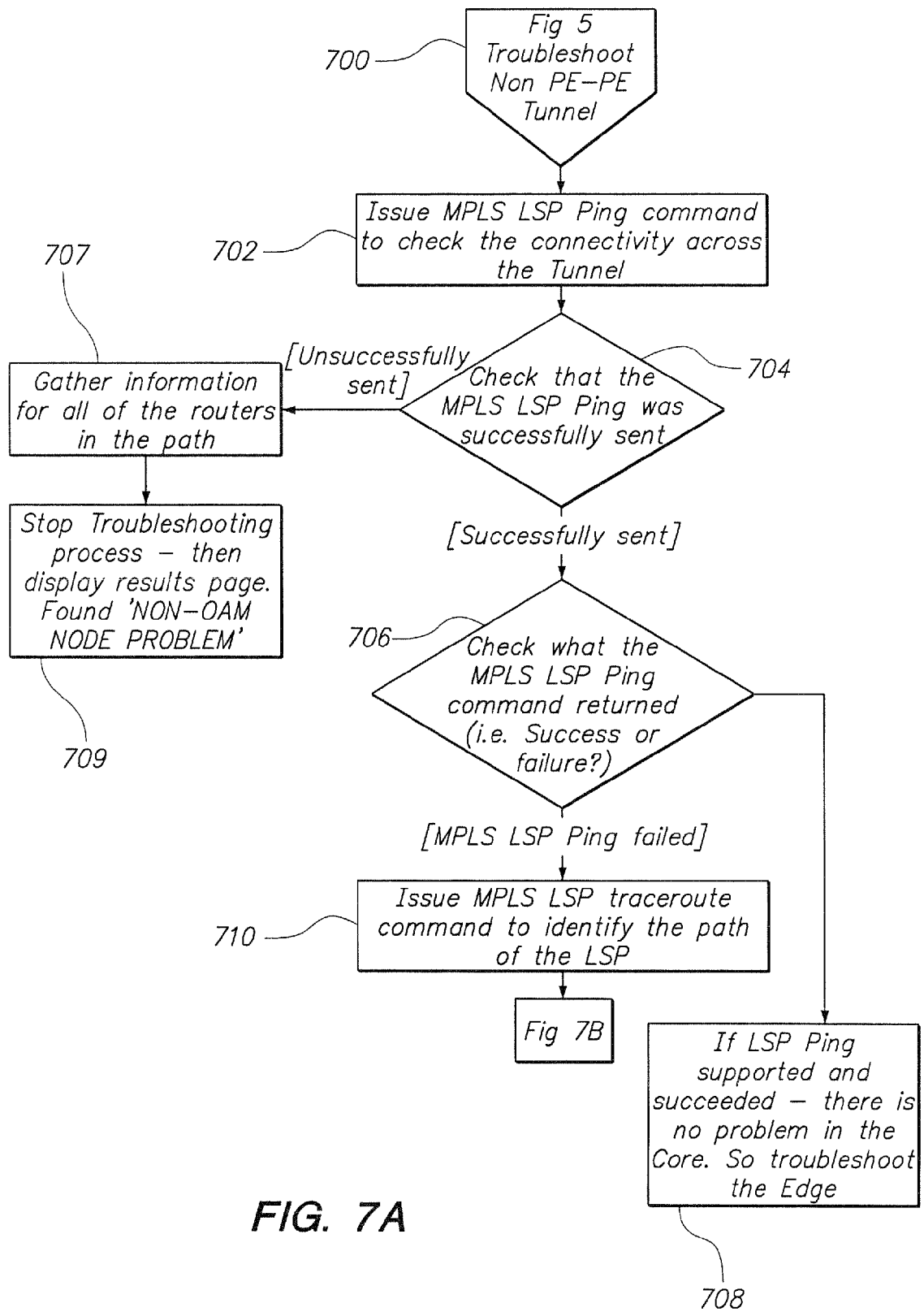
FIG. 7A is a flow diagram illustrating at a low level implementation of a further aspect of an example method.
Figure 7B:
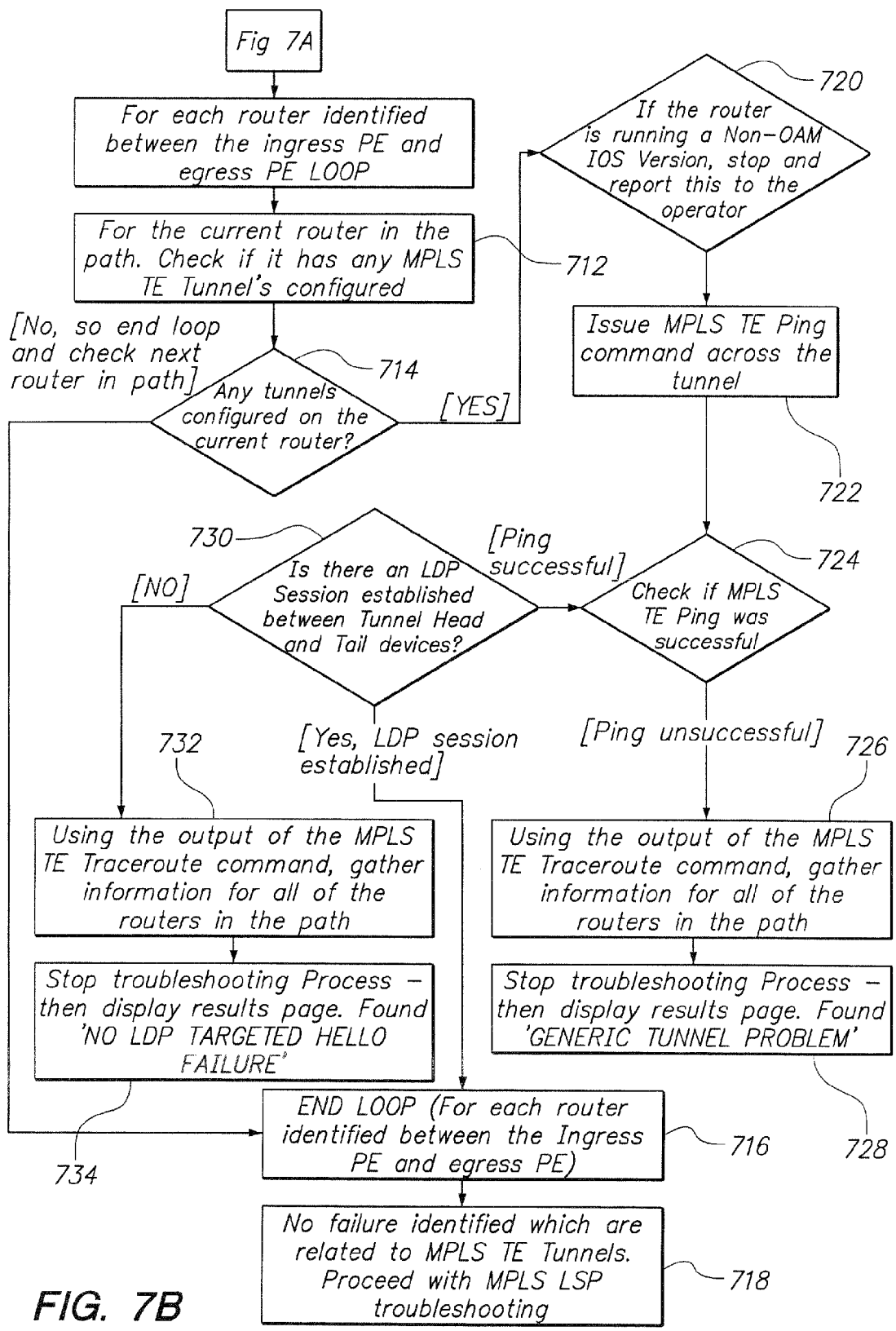
FIG. 7B is a continuation of FIG. 7A.

The approach can be understood in more detail with reference to the subsequent steps shown in more detail in FIG. 7A and FIG. 7B. At step 702, the process first checks for basic PE-PE connectivity by issuing an MPLS LSP ping command to check the connectivity. At step 704 a check is carried out to establish that the ping command was successfully sent and if not then at step 707 information is gathered for all of the routers on the path for example using the MPLS TE traceroute command output and at step 709 the process is terminated and the results page displayed for example indicating "NON OAM NODE PROBLEM".

If the LSP ping is successfully sent and the node is hence OAM compliant then at step 706 the LSP ping returned command result is checked. If the result is supported and succeeded at step 708 then there is no problem on the tunnel and the process is terminated with no problem found in the MPLS domain although troubleshooting may or will continue on other existing parts of the network.

At step 710, once any PE-P tunnels have been explored and/or discounted then an MPLS LSP traceroute command is issued to identify the path of the LSP. For example referring to FIG. 3C a traceroute command issued at ingress PE 340 would show the MPLS LSP as comprising ingress PE, node A, node B, node C, egress PE. In the example of FIG. 3C it will be recognized that either no MPLS TE primary tunnel was found configured on the ingress PE or tunnel 350 was found on the ingress PE and showed no connectivity problem. In addition any TE tunnels from the ingress PE node 340 to P nodes such as node A, node B or node C have either been found or have been found to carry no faults.

Referring now to FIG. 7B, the subsequent steps are carried out for the first and each subsequent router identified between the ingress PE and egress PE, for example starting with node A in FIG. 3C. At step 712 the NMS carries out check as described above to establish whether the node has any MPLS TE tunnels configured towards the egress PE for example by using the "show" command and supplying a parameter value for the IP address of the desired egress PE which will return data only for the relevant paths.

In order to implement PE-P tunnel diagnostics, according to one possible approach, the OS command "show ip cef <egress PE ip address>" performs a lookup against the ingress PE's Forwarding Information Base (FIB). The output of this command is used by the algorithm to establish whether (a) there are tunnels configured towards the destination PE. This is due to the command output only returning FIB entries which match the specified egress PE IP Address, and (b) the tunnel is actually being used to carry traffic towards the destination PE. This is indicated by the command output stating that the traffic will be switched via the tunnel interface.

Since part (a) above assures that only tunnels which are on the path to the egress PE are considered, and part (b) above assures that this tunnel will be used to carry traffic from ingress to egress PE, then the process herein has correctly identified a tunnel which should be considered by the troubleshooting process, as it will carry traffic between the ingress PE and the egress PE for this path. The connectivity of the tunnel identified by the above process is then checked via the Tunnel Ping command, which is executed on the ingress PE. If the ping is unsuccessful, then the troubleshooting process is terminated and a results page is displayed showing a message such as "GENERIC TUNNEL PROBLEM," or some other message.

If, at step 714 no such tunnels are configured then at step 716 the loop is repeated for any further nodes (for example node B and node C) but otherwise a report is generated at step 718 and the approach can proceed to the methods described in Monaghan et al to diagnose/troubleshoot any MPLS LSPs, since it is know from the previous LSP ping failure that there is a definite MPLS problem.

If at step 714 TE tunnels are discovered on the current router, node A in the present embodiment, then at step 720 a check is carried out for example using IOS "show" commands to establish whether the router is running a non-IOS version and if so a report is generated in the method described. Otherwise, at step 722 an MPLS TE ping command is issued across the tunnel and checked at step 724.

If the check shows that the ping was unsuccessful then at step 726 an MPLS TE traceroute command is used to gather information for all the routers in the path and at steps 728 the troubleshooting process is terminated and a results pages displayed showing a message such as "GENERIC TUNNEL PROBLEM", together with any other additional information derived from a diagnosis step as described in more detail above.

If the ping is successful then at step 730 the process checks for any LDP session established between the tunnel head and tail devices. If an LDP session is established between the tunnel head and tail devices, then the process proceeds to step 716 where the loop is repeated for any further node in the path.

If there are no further nodes then once again the report is generated at steps 718 indicating that no MPLS TE tunnels have been identified or that there are tunnels but no problems with them such that standard MPLS LSP troubleshooting can be implemented. If no LDP session is identified, then at step 732 the MPLS TE traceroute command is used once again to gather information for all of the routers in the path, together with any appropriate diagnosis step. Further, an appropriate report is generated at step 734 together with termination of the trouble shooting process indicating "no LDP TARGETED hello failure" when LDP targeted hello allows non-directly connected LDP neighbors such as the tunnel head and tail to form targeted LDP sessions and therefore exchange LDP information.

Once node A has been fully checked then the same approach is adopted for each of node B and node C. In addition if multiple TE tunnels are found on any of the nodes then of course the process is repeated for each of the multiple TE tunnels. If as shown in FIG. 3C the tunnel topology includes, for example, backup paths through nodes not on the LSP then the steps described above can additionally be implemented on the further nodes (node F and node G in FIG. 3C) or can be limited to nodes A, B and C on the LSP but indicating the additional nodes in the tunnel topology map generated at the GUI.

Although the approach described above indicates that the diagnostic and topology routine is terminated once a fault is detected, it can be run on a pure topology discovery level such that all of the steps described above are repeated for each node even where a fault is found.

In some instances, certain nodes on the LSP may be non OAM compliant or otherwise unable to process the path trace steps described above such as ping and traceroute. In that case the NMS can be configured to find the next node in the path for example configured on the ingress or the egress PE or from the forwarding table on the non-compliant node. As a result, the process can continue even though non compliant nodes are found on the path. In addition the NMS can log onto the next OAM compliant node and interrogate the forwarding table for example via the CLI and appropriate IOS "show" command to establish whether the compliant node is in a tunnel using for example a "TE topology command" of known type from which the NMS can infer and report that the non-compliant node is in fact a tunnel start point.

The approach described herein can be implemented in conjunction with quality of service "QOS" techniques and checks. For example where incoming traffic is marked with a predetermined QOS flag (priority) on entry into the MPLS LSP then it may be forwarded in to a predetermined TE tunnel for example providing fast connectivity or some other quality requirement. Any such tunnel can be validated for QOS checking purposes however the tunnel is engineered or configured, and ingress and egress information together with the QOS marker can be provided allowing class based tunnel selection.

Any appropriate tunnel type of a configured or engineered type can be discovered in this manner. For example auto-announced tunnels can be identified by virtue of the fact that the forwarding tables (FIB and LFIB) on the nodes are interrogated for tunnel presence for the prefix in question which will detect auto-announced tunnels as well.

The steps described above can be implemented in any appropriate manner for example software, hardware or firmware on an NMS or other device capable of diagnosing and logging on to the various remote devices.

The NMS can be implemented in any location and in any appropriate manner and logging onto remote diagnosable nodes can be carried out in any appropriate manner. For example, the Telnet function can be used. For example end to end troubleshooting can be implemented for a network path between customer equipment points in which packet transport from customer equipment to provider edge is carried out using wide area network (WAN) technology and provider edges communicate via the MPLS protocol, or where parts of the communication path between equipment includes MPLS forwarding. However, the method can also be implemented in relation to any other end-to-end path or path portions including pure IP paths.

Indeed it will be seen that the method may be implemented beyond the layer 3 services such as VPN and internet access described above in which the customer devices exchange layer 3 routing information with the service provider and packets are transported initially using layer 3 routing mechanisms and using other transport technologies such as MPLS where appropriate to help deliver packets. For example the method can be applied in relation to layer 2 services in which there is no exchange of layer 3 routing information with the service provider and packets are delivered using layer 2 technologies such as a asynchronous transfer mode (ATM), frame relay or pseudo wire. Whether the service is layer 2 or layer 3 based, the WAN technology can be for example a circuit based technology such as ATM or frame relay, or technologies such as Ethernet, point to point protocol or high-level data link control (HTLC). Where the service is layer 3 then an IP routing protocol may also run over the WAN link, between the customer and provider edges as well as potentially an additional protocol running between the provider edges such as multi protocol border gateway protocol (MB-BGP).

The approaches described herein can be implemented in many different ways. For example, the approaches herein can be integrated into the MPLS OAM capability in Cisco IOS® Software from Cisco Systems, Inc of San Jose, USA. Cisco IOS® Software provides support for VRF ping and traceroute, LSP or TE ping and traceroute and so forth Even where some routers in the MPLS network do not support ping/traceroute functionality, diagnostics may still be possible in a network that consists of nodes that do not support OAM protocols being issued at the ingress of the path. For example such nodes may drop the OAM packets but further nodes downstream may replay and hence can be diagnosed.

In addition the mechanisms described in "MPLS OAM tools for troubleshooting MPLS Networks" and "Cisco MPLS Management Strategy" can be implemented as described in the respective documents and "cdccont_0900aecd80272b7f.pdf" in the directory "application/pdf/en/us/guest/netsol/ns172/c654" of the domain "Cisco.com" of the World Wide Web and "tech_brief0900aecd800f6e31.html" in the directory "en/US/tech/tk436/tk892" of the domain Cisco.com on the World Wide Web. In case where the network management system does not have the authority to modify the remote device configuration it may instead present the recommendation as a set of steps to be performed by the operator/administrator.

In an embodiment, troubleshooting, diagnosis and discovery tasks are simplified. In an embodiment, the approaches herein may be incorporated into products such as Cisco MPLS Diagnostic Expert (MDE) available from Cisco Systems Inc of San Jose, Calif., USA which provides an expert system style approach to troubleshooting providing benefits to service providers such as reduced operation expense and mean time to repair.

4.0 Implementation Mechanisms—Hardware Overview

Figure 8:
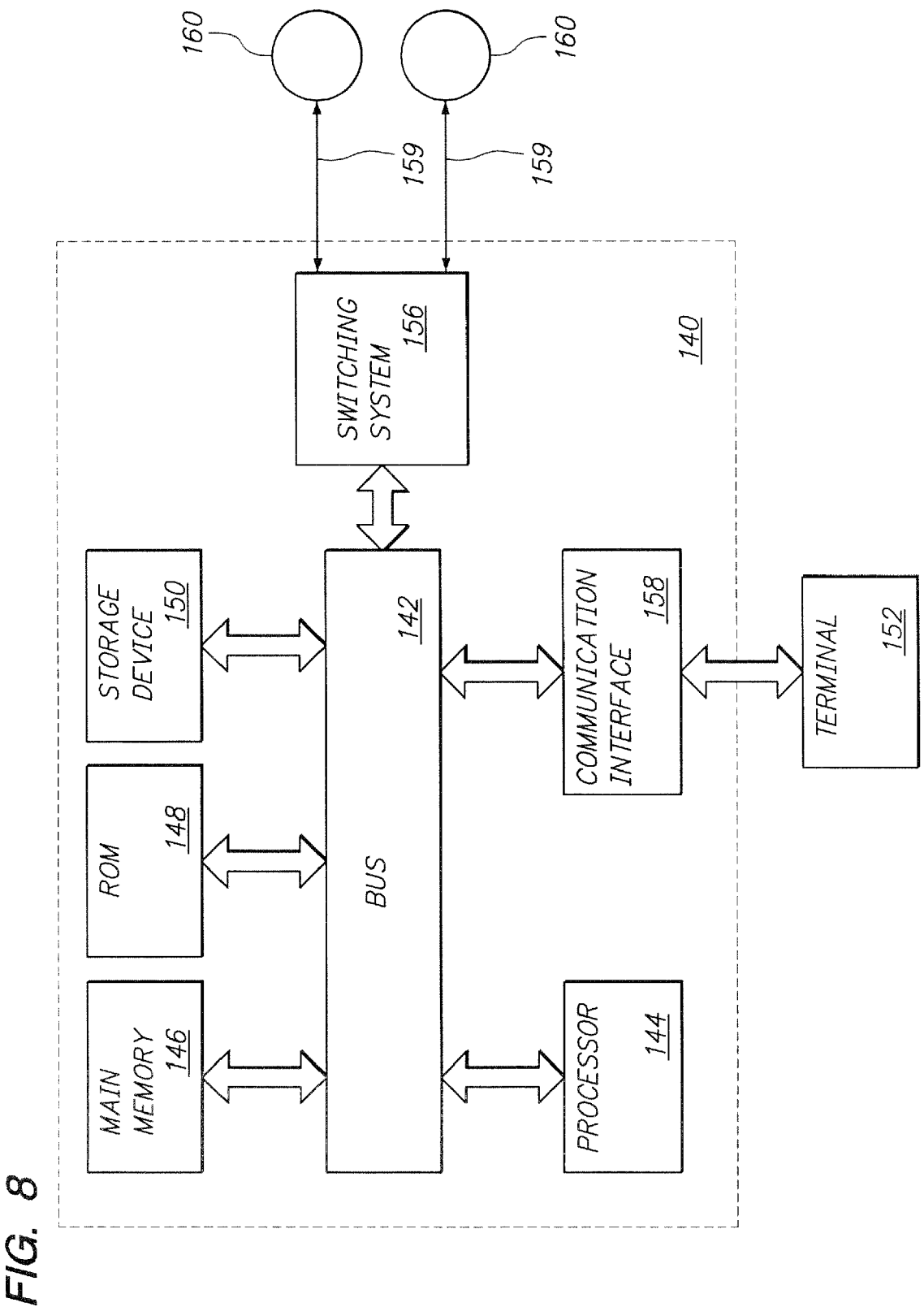
FIG. 8 is a block diagram that illustrates a computer system upon which an example method may be implemented.

FIG. 8 is a block diagram that illustrates a computer system 40 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a network management or diagnosable node the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, and volatile media. Non-volatile media includes, for example, optical or magnetic disks, such as storage device 150. Volatile media includes dynamic memory, such as main memory 146.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The method steps set out can be carried out in any appropriate order and aspects from the examples and embodiments described juxtaposed or interchanged as appropriate. It would be appreciated that the approach can be adopted in respect of any MPLS network including but not limited to MPLS VPN either at the service provider or enterprise network level. The approach can be used in addition to troubleshooting for post provision in connectivity checks or VPN connections which can reduce the cost of provisioning significantly. The approaches can be implemented in relation to any appropriate label switching protocol including LDP and tag distribution protocol (TDP).

What is claimed is:
1. An apparatus, comprising:
   one or more processors;
   first logic encoded in one or more tangible media for execution and when executed operable for discovering, without prior knowledge of an existence of tunnels in a data communications network and without prior knowledge of a topology of the data communications network, whether for a pair of nodes in the data communication network one or more configured tunnels have been already established, and remotely accessing each node in a plurality of nodes in the data communications network;
   second logic which when executed is operable to identify, for every accessed node of the plurality of nodes, whether a tunnel is configured on the accessed node; and
   third logic which when executed is operable, when the identified tunnel is configured on the accessed node, to determine whether the identified tunnel is a load balancing tunnel, and in response to determining that the identified tunnel is not a load balancing tunnel, determining whether the identified tunnel is a backup-path-fast-reroute tunnel, and whether the identified tunnel has a fault.
2. An apparatus as claimed in claim 1, further comprising logic which when executed is operable to generate a fault report on a graphical user interface.

3. An apparatus as claimed in claim 1, further comprising logic which when executed is operable to discover tunnel components in the identified tunnel.

4. An apparatus as claimed in claim 1, further comprising logic which when executed is operable to determine if multiple tunnels are identified as configured on the accessed node, and further comprising logic which when executed is operable to identify whether each of the identified tunnels has a fault.

5. An apparatus as claimed in claim 1, further comprising logic which when executed is operable to first access an ingress node to a label switched path and to subsequently access at least one node downstream of the ingress node in the label switched path.

6. An apparatus as claimed in claim 1, further comprising logic which when executed is operable to obtain additional information relating to one or more of the nodes in an identified tunnel, in which the additional information includes at least one of tunnel identification, interface identification, and tunnel source and destination identification.

7. An apparatus as claimed in claim 1 in which the node comprises one of a bridge, switch or router.

8. An apparatus as claimed in claim 1 in which the tunnel comprises a multi-protocol label switching traffic engineered (MPLS TE) tunnel.

9. An apparatus as claimed in claim 1, further comprising logic which when executed is operable to identify whether the identified tunnel has a fault using a connectivity check across the tunnel.

10. A computer-implemented method of discovering a configured tunnel between nodes on a path in a data communications network, the method comprising:
discovering, without prior knowledge of an existence of tunnels in a data communications network and without prior knowledge of a topology of the data communications network, whether for a pair of nodes in the data communication network one or more configured tunnels have been already established, and remotely accessing each node in a plurality of nodes in the data communications network;
identifying, for every accessed node of the plurality of nodes, whether a tunnel is configured on the accessed node; and
determining whether the identified tunnel is a load balancing tunnel, and in response to determining that the identified tunnel is not a load balancing tunnel, determining whether the identified tunnel is a backup-path-fast-reroute tunnel, and whether the identified tunnel has a fault;
wherein the method is performed by one or more computing devices.

11. A method as claimed in claim 10 further comprising determining if multiple tunnels are identified as configured on the accessed node, and identifying whether each of the identified tunnels has a fault.

12. A method as claimed in claim 10 further comprising accessing an ingress node to a label switched path and subsequently accessing at least one node downstream of the ingress node in the label switched path.

13. A method as claimed in claim 10 further comprising obtaining additional information relating to one or more of the nodes in the identified tunnel, in which the additional information includes at least one of tunnel identification, interface identification, and tunnel source and destination identification.

14. A data processing apparatus configured for discovering a configured tunnel between nodes on a path in a data communications network, and comprising:
one or more processors;
means for discovering, without prior knowledge of an existence of tunnels in a data communications network and without prior knowledge of a topology of the data communications network, whether for a pair of nodes in the data communication network one or more configured tunnels have been already established, and remotely accessing each node in a plurality of nodes in the data communications network;
means for identifying for every accessed node of the plurality of nodes, whether a tunnel is configured on the accessed node; and
means for determining whether the identified tunnel is a load balancing tunnel, and in response to determining that the identified tunnel is not a load balancing tunnel, determining whether the identified tunnel is a backup-path-fast-reroute tunnel, and whether the identified tunnel has a fault when the identified tunnel is configured on the accessed node.

15. An apparatus as claimed in claim 14 further comprising means for determining if multiple tunnels are identified as configured on the accessed node, and means for identifying whether each of the identified tunnels has a fault.

16. An apparatus as claimed in claim 14 further comprising means for accessing an ingress node to a label switched path and means for subsequently accessing at least one node downstream of the ingress node in the label switched path.

17. An apparatus as claimed in claim 14 further comprising means for obtaining additional information relating to one or more of the nodes in the identified tunnel, in which the additional information includes at least one of tunnel identification, interface identification, and tunnel source and destination identification.

18. A non-transitory computer readable volatile or non-volatile storage medium storing one or more sequences of instructions for discovering a configured tunnel between nodes on a path in a data communications network and which instructions, when executed by one or more processors, cause the more or more processors to perform:
discovering, without prior knowledge of an existence of tunnels in a data communications network and without prior knowledge of a topology of the data communications network, whether for a pair of nodes in the data communication network one or more configured tunnels have been already established, and remotely accessing each node in a plurality of nodes in the data communications network;
identifying, for every accessed node of the plurality of nodes, whether a tunnel is configured on the accessed node; and
determining whether the identified tunnel has been already configured as a load balancing tunnel, and in response to determining that the identified tunnel is not a load balancing tunnel, determining whether the identified tunnel is a backup-path-fast-reroute tunnel, and whether the identified tunnel has a fault.

19. A computer readable storage medium as claimed in claim 18 further comprising instructions which when executed cause determining if multiple tunnels are identified as configured on the accessed node, and instructions which when executed cause identifying whether each of the identified tunnels has a fault.

20. A computer readable storage medium as claimed in claim 18 further comprising instructions which when executed cause accessing an ingress node to a label switched path and instructions which when executed cause subsequently accessing at least one node downstream of the ingress node in the label switched path.

21. A computer readable storage medium as claimed in claim 18 further comprising instructions which when executed cause obtaining additional information relating to one or more of the nodes in the identified tunnel, in which the additional information includes at least one of tunnel identification, interface identification, and tunnel source and destination identification.

* * * * *